350-286.
9-11-73 OR 3,758,197
SR

United States Patent [19]

Klang et al.

[11] 3,758,197

[45] Sept. 11, 1973

[54] LIGHT COLLECTING AND TRANSMITTING APPARATUS

[75] Inventors: Daniel M. Klang, Huntington Station; Roger Mosciatti, Coram, Long Island, both of N.Y.

[73] Assignee: Bucode, Inc., Hauppauge, N.Y.

[22] Filed: Nov. 15, 1971

[21] Appl. No.: 198,588

[52] U.S. Cl. .................................. 350/286, 242/148
[51] Int. Cl. .................................. G02b 5/04
[58] Field of Search ................. 242/184; 250/219 L; 350/286, 287

[56] References Cited

UNITED STATES PATENTS 3,417,615 12/1968 Ryder ................................ 350/286

*Primary Examiner*—David Schonberg
*Assistant Examiner*—Michael J. Tokar
*Attorney*—Harvey W. Mortimer et al.

[57] ABSTRACT

An optical device for collecting and transmitting light is described. It consists of a longitudinal bar which is composed of transparent material and which has a plurality of totally reflecting prisms arranged in step-like fashion along an inclined surface of the bar. Light incident on one side of the bar is reflected within the bar toward the base of the bar and light incident on the base of the bar is reflected out one side of the bar.

14 Claims, 8 Drawing Figures

INVENTORS
DANIEL KLANG
ROGER MOSCIATTI

INVENTORS
DANIEL KLANG
ROGER MOSCIATTI

LIGHT COLLECTING AND TRANSMITTING APPARATUS

The invention described herein relates to an optical device for collecting light and for transmitting light and to the use of that device in an optical sensing system; specifically, sensing the position of a tape loop in a tape loop storage column.

There are many situations in which it is desired to detect the presence or absence of light normally incident on a plane which extends along a discrete length and to use that information to control various functions. For example, in magnetic tape transports used in computing and data processing systems, it is common to provide a tape loop storage column on either side of the magnetic head and capstan assembly so that the tape in the vicinity of the magnetic heads can be isolated for more rapid acceleration and deceleration of the tape by the capstan. The tape is usually maintained in a loop in each of the columns so as to lengthen and shorten during supply and take-up operations. One of the requirements of such a system is for means to continuously sense the actual length of the tape loops in the column so that control may be exercised over the tape reels to counteract the changes in the length of the loops.

Another situation where it is often desired to continuously monitor the position of an object along a discrete length is in the fluid guage art.

In a method previously used for sensing the position of an object along a discrete length, a light source was positioned along the entire length to be sensed and a bank of photosensors was positioned opposite the light source. The light source and the photosensors were arranged on opposite sides of the path of travel of the object whose position was to be sensed so that movement of the object along its path of travel would cause the object to block the light normally incident on those photosensors directly adjacent the object. As the object proceeded further along the discrete length, the light normally impinging on succeeding photosensors would be blocked causing fewer and fewer of the photocells to be actuated. By means well known in the art, the exact position of the object along the discrete length at any given time could be determined by the number of photosensors being actuated at that time. Also, the presence or absence of a signal from each of the photosensors was used to control a particular function. For example, in sensing the position of tape loops, the number of photosensors being actuated at any given time would indicate the approximate position of the tape lop in the storage column of the tape transport so that a signal could be generated which would cause the tape reel to either take-up or let-out more tape in order to achieve the desired length of tape in the column.

The use of a bank of photosensors positioned along a discrete length for sensing object position is somewhat unsatisfactory for a number of reasons. First of all, when it is desired to provide a signal to continuously monitor the exact position of the object along the discrete length, it is necessary to have photosensors along the entire length being monitored. Where the length is long, a great many photosensors would be needed since they would have to be closely spaced to continuously monitor the objects' position. The problem arises from the difficulty in maintaining the outputs of all of the photosensors uniform over a prolonged period of time. This is a necessity if the photosensors are to accurately monitor the object's position. Furthermore, a change in the output of one or more of the photosensors could seriously effect the accuracy of the system since this would cause the position of the object to be erroneously indicated. It would be difficult over a long period of time to continuously monitor the photosensor outputs to insure that they were uniform, especially when a large number of photosensors were being used.

Another problem encountered when using a bank of photosensors is that often, because of space requirement, it is not physically possible to position the photosensors along the length desired to be sensed. For all of these reasons, positioning a bank of photosensors along the length desired to be monitored is unsatisfactory.

Accordingly, it is an object of the present invention to provide a longitudinally extending optical device for collecting light incident along the length of the device and transmitting the light through the device to its base portion.

It is a further object of the present invention to provide a longitudinally extending optical device for transmitting light incident upon the base of the device and reflecting the light out from the device along its length.

It is another object of the present invention to provide optical apparatus for sensing the presence or absence of light along a discrete length without the use of a bank of photosensors.

A further object of the present invention is to provide optical apparatus for sensing the position of an object along a discrete length using only one photosensitive device.

It is a further object of this invention to provide optical apparatus for sensing the position of an object along a discrete length which produces an integrated and distinct signal in the photosensor for each increment along the monitored length.

It is a further object of this invention to provide an optical apparatus for sensing the position of an object along a discrete length in which the intensity of the light incident along the discrete length need not be uniform.

It is a further object of this invention to provide an optical apparatus for sensing the position of an object along a discrete length in which neither the photosensitive device nor the light source are positioned along the monitored length.

It is a further object of this invention to provide an optical apparatus which is economical to manufacture and suitable for use where minimum space is available for sensing apparatus along the monitored length.

Briefly, the optical device of the present invention consists of a longitudinally extending, integral bar composed of transparent material and having at least one inclined surface. A plurality of totally reflecting prisms (45°–45°–90°) are formed on the inclined surface of the bar. The prisms are arranged in step-wise fashion such that light incident along the length of the bar is reflected by the prism reflecting surfaces through the bar to the base of the bar. Similarly, light incident upon the base of the bar is transmitted through the bar and reflected by the prism reflecting surfaces out from the bar along its length.

The optical apparatus for sensing the position of an object along a discrete length consists of a single photosensor positioned at the base of the multi-prism bar to receive the light reflected through the bar by the prism reflecting surfaces. Since the prisms are arranged in step-wise fashion along the inclined surface of the bar so that each prism is at a distinct height, the light reflected by each prism is distinct and separate from the light reflected from any of the other prisms along the bar.

Since the multi-prism position of the bar is equal in length to the discrete length being monitored, when no object is present, all the light incident on the prism reflecting surfaces is reflected through the bar and onto the photosensor positioned at the base of the bar. When the object whose position it is desired to sense moves along a portion of the length of the bar, the object blocks the light normally incident on the prism reflecting surfaces up to that portion of the bar. The reduction in the amount of light reaching the photosensor provides a distinct indication of the position of the object along the length of the bar.

In one embodiment of the present invention, a second multi-prism bar is used in conjunction with the light collecting bar described above to provide the light incident along the length of the light collecting bar. A single light source is positioned at the base of the second multi-prism bar. Light from the source is transmitted through the bar and is reflected by each of the prism reflecting surfaces out from the bar along its entire length. In another embodiment of the present invention, a frosted light bar is used in place of the light transmitting multi-prism bar.

Other objects and advantages of the present invention are explained in the following specification, considered together with the accompanying drawings, in which.

Figure 1:
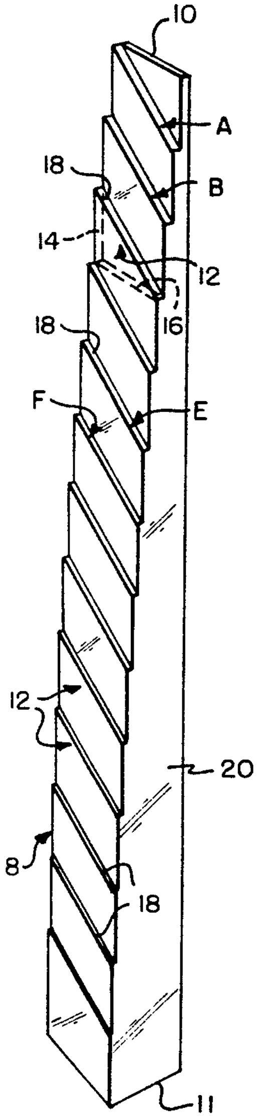
FIG. 1 is a perspective view of the preferred embodiment of the multi-prism bar of the present invention.

Referring now to FIG. 1, the preferred embodiment of the multi-prism bar of the present invention is shown. The bar is essentially a right triangular solid varying in height from its apex 10 to its base 11. A plurality of prisms 12 are formed on the inclined surface of the bar. The prisms are of the type which are designated totally reflecting prisms, diagonal prisms or 45°–45°–90° prisms. These prisms are formed from right triangular sections in which the length of the two legs 14 and 16 of the prism are equal. The reflecting surface 18 of these prisms is inclined at 45° so that the light normally incident on the left side of the bar enters the prism and is reflected downwardly through the bar by the reflecting surface to the base of the bar. The advantage of totally reflecting prisms over metallic surfaces as reflectors are that the light is totally reflected while no metallic surface reflects all of the light incident in it, and that the reflecting properties of the prism are not affected by tarnishing.

Figure 4:
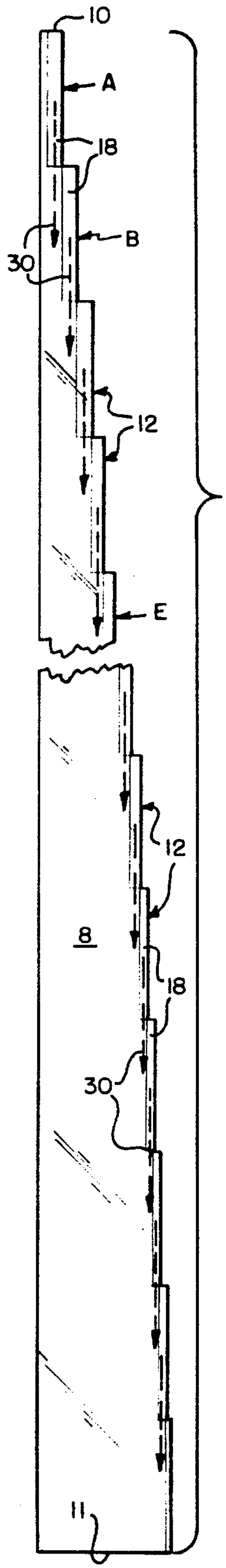
FIG. 4 is an enlarged side view, partially broken of the multi-prism bar illustrated in FIG. 1.

The prism reflecting surfaces 18 are each inclined at a 45 degree angle to the side wall 20 of the multiprism bar. The leading edge of each of the prisms (in FIG. 1, the left hand side) with the exception of the prism nearest the apex of the bar is horizontally aligned with the trailing edge of the preceding prism (illustrated in FIGS. 4 and 6) although these edges are horizontally displaced a distance equivalent to the width of the bar (illustrated in FIGS. 1 and 2).

Figure 3:
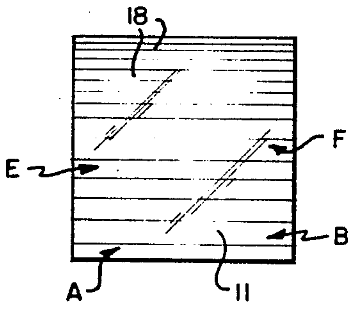
FIG. 3 is an enlarted view of the base of the multi-prism bar illustrated in FIG. 1.

Each of the prisms in the multi-prism bar illustrated in FIG. 1 occupies a discrete area in the depth of the bar such that no two prisms are at the same elevation with respect to the bottom surface of the bar. This is best illustrated in FIG. 3 which is an end view of the base of the bar. The reflecting surfaces of all of the prisms in the bar are imaged on the base of prism. It is seen that the prism A which is positioned at the apex of the bar occupies the lowermost discrete area. Prism B which follows prism A is step wise fashion occupies the second lowest discrete area. In like manner, prisms E and F occupy discrete areas in the bar.

The fact that the trailing and leading edges of successive prisms in the multi-prism bar of FIG. 1 are horizontally aligned makes it possible to sense the presence or absence of light on every increment along the length of the bar. This is one of the advantages of the multi-prism bar over the bank of photosensors in performing light collecting. Every incremental length along the side of the bar is sensitive to the presence or absence of light, unlike the bank of photosensors which usually has gaps between individual photosensors. Also, when the multi-prism bar is used to transmit light from its base to the prisms which reflect the light outwardly along the side of the bar, the edge to edge alignment discussed above results in light being emitted along the entire length of the bar.

The fact that each of the prisms in the multi-prism bar of FIG. 1 occupies a discrete area in the bar not occupied by any other prism permits the bar to be used to continuously monitor the position of an object along its length using only a single photosensor. As illustated in FIG. 2, light incident on the reflecting surfaces of each of the prisms along the entire length of the bar is deflected downwardly through the bar and onto a light sensing device positioned beneath the base of the bar. Since each prism occupies a unique area, the light reflected from that prism (for example, prism A in FIG. 3) is distinct from the light reflected from another prism (for example, prism F in FIG. 3).

Also, when the multi-prism bar is used for transmitting light and reflecting it outwardly along its length, the fact that each prism occupies a distinct area makes it possible to use only a single light source positioned at the base of the bar for all the light that is emitted from the side of the bar.

Figure 6:
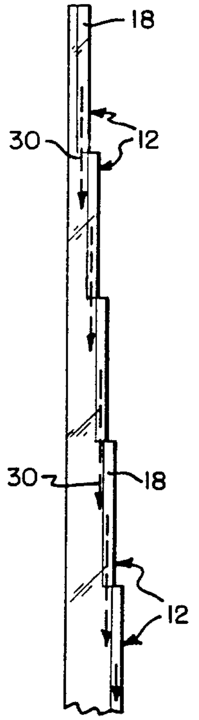
FIG. 6 is a side view, partially broken away, of a second embodiment of the multi-prism bar of the present invention.
Figure 2:
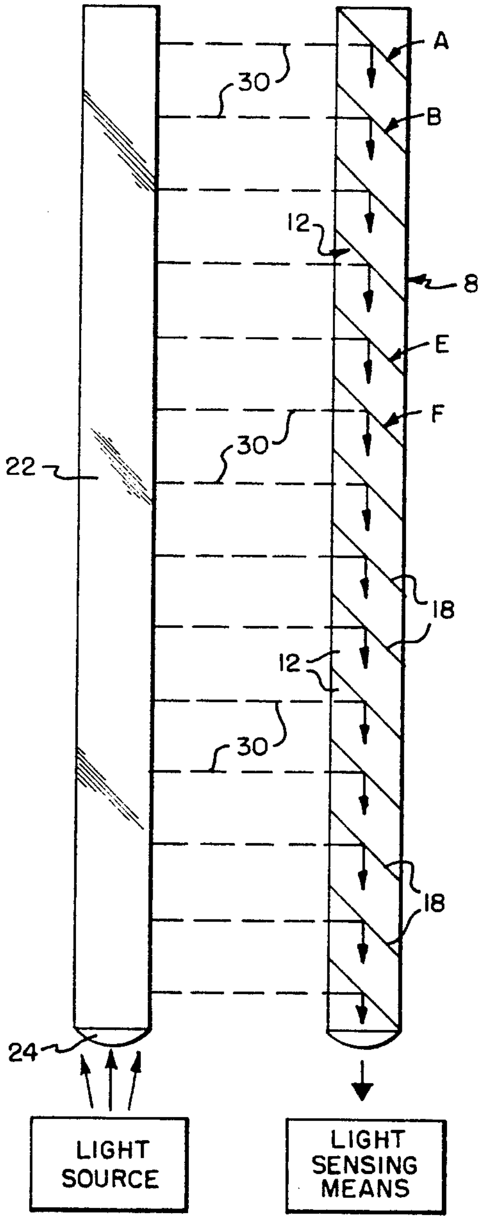
FIG. 2 is a schematic representation of the optical sensing apparatus of the present invention.

Referring to FIGS. 1, 3 and 6, it will be noted that height of each of the prisms in the multi-prism bar varies with the base prism A having the greatest height and succeeding prisms having gradually diminishing heights. The variation in the height of each of the prisms, of course, represents a variation in the area of the reflecting surfaces of each of the prisms (see FIG. 3). The purpose of this variation in the preferred form of this invention illustrated in FIGS. 1–5 is to compensate for a non-uniform light intensity incident on multi-prism bar such as would be caused by using a frosted light bar as a means for transmitting light from a light source positioned beneath its base and dispersing the light so that it is incident along the length of the multi-prism bar. This configuration is illustrated in FIG. 2. The frosted light bar is a commercially available and well known device for dispersing light from a source positioned beneath the base of the light bar.

The frosted light bar 22 is square in cross-section and has a spherical lens 24 molded on its base to collinate the light from the source. Although not illustrated in FIG. 2, it will be recognized by those skilled in the art that if it is desired to enhance the intensity of the light reflected from the right side of light bar 22, the three other surfaces of the bar could be covered with a reflective coating. Also, if enhancement of light intensity is not desired, the three non-used surfaces of the bar could be covered with shields or with a non-reflective coating.

As previously indicated, the intensity of the light emitted from the right side of the frosted light bar 22 is non-uniform. It has been found that the intensity of the light emitted decreases as the distance from the light source increases. For example, in the configuration illustrated in FIG. 2 where the frosted light bar was 7 inches long, it would found that the light energy emitted near the base of the light bar was approximately four times as great as the light energy emitted at the top end of the light bar. In order to insure that the amount of light received by the photosensitive device positioned beneath the multi-prism bar 8 in FIG. 2 is linear and proportional to the position of an object along the length of the multi-prism bar, and important feature of this invention is varying the areas of the reflecting prisms to compensate for the non-uniform light intensity incident on the multi-prism bar. In the preferred embodiment, the areas of each of the prisms was varied such that the area of each succeeding prism increased with increasing distance from the base of the multi-prism bar. Thus, the prism nearest the apex of the multi-prism bar has the largest area to compensate for the small intensity of the light emitted by the frosted light bar 22. The precise area of each of the prisms will vary in different applications depending on the intensity of light incident on the side of the prism bar.

Figures 5, 7, 8:
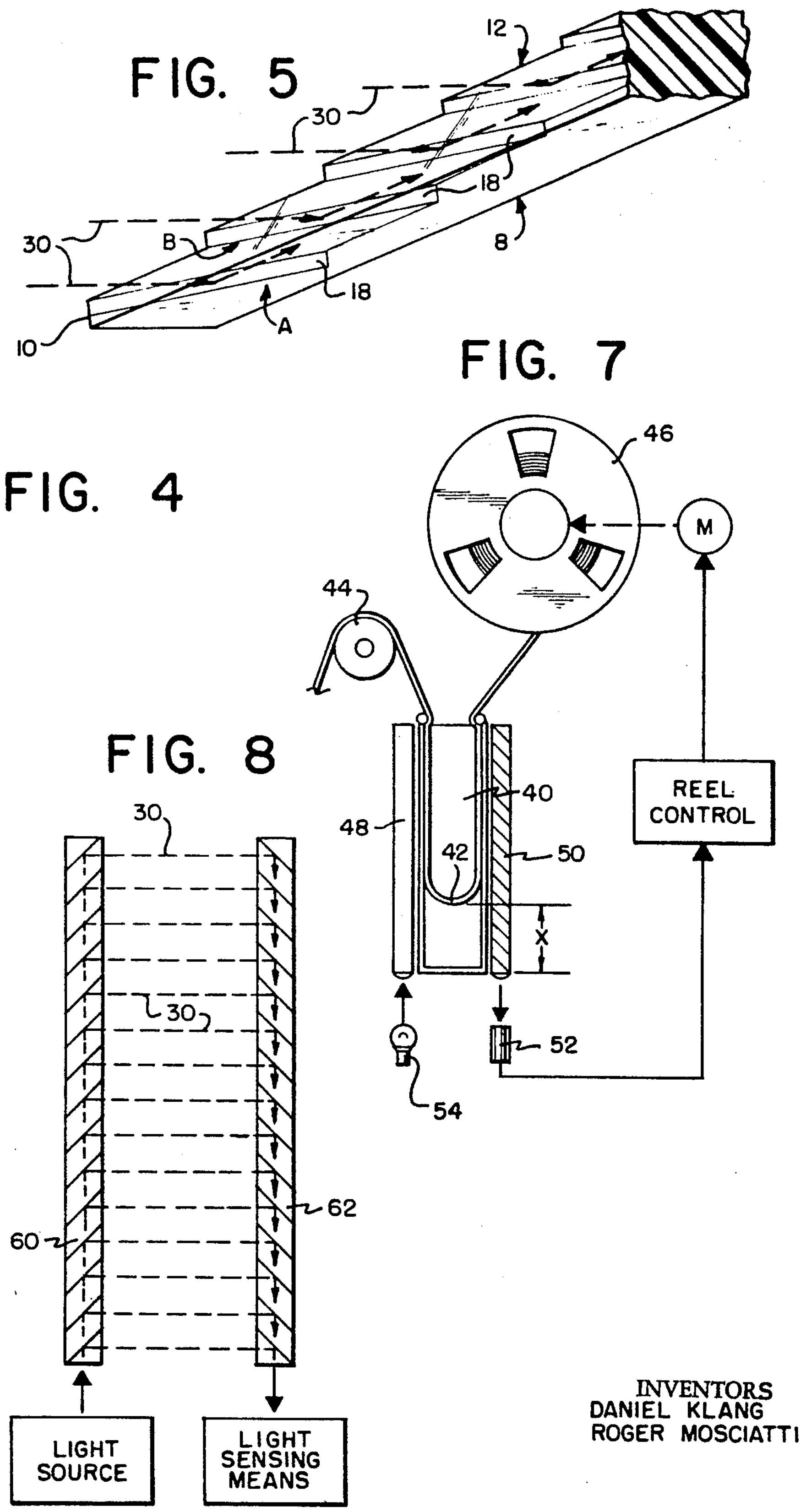
FIG. 5 is a perspective view of a portion of the mutli-prism bar illustrated in FIG. 1.
FIG. 7 is a schematic representation of the utilization of one form of the optical sensing apparatus of this invention in a tape loop storage column.
FIG. 8 is a schematic view of a third embodiment of the multi-prism bar of the present invention in an optical sensing apparatus.

As previously indicated, the multi-prism bar illustrated in FIG. 1 can also be used to transmit light from a source positioned beneath its base and reflect the light transmitted onto a light collecting multi-prism bar. An optical apparatus of this type is illustrated in FIG. 8. In this case, if the area of the reflecting surfaces of the prisms is equal along the length of the multi-prism bar, the distribution of the light intensity along the bar would be uniform. In this case, the corresponding areas of the prism reflecting surfaces in the light collecting multiprism bar would be uniform and equal to the prism area in the light transmitting and reflecting multi-prism bar. As with the preferred embodiment, the light reflected onto the light sensing means positioned beneath the multi-prism bar 28 would be linear and directly porportional to the position of the object along the length of the multi-prism bar.

In the preferred embodiment, the bar is molded from a transparent synthetic organic material such as the acrylic resins known under the trademarks PLEXIGLAS and LUCITE. It is also possible to form the bar from glass, polystyrene, polycarbonate and similar material.

The length of the multi-prism bar is dictated by the length desired to be monitored. The height and the width of the bar are usually dictated by space requirements. One important consideration is that the width of the bar for a particular length bar determines the amount of reflecting prisms in the bar. This is because the two non-reflecting sides of the prisms must be equal. Thus, a bar 10 inches in length and 1/2 inch wide would be composed of 20 reflecting prisms. If it were also required that the thickness of the bar at any one point be no greater than 2 inches, then the sum total of the thicknesses of all of the reflecting prisms could be no greater than 2 inches. If each of the reflecting surfaces were to be of equal height (see FIG. 6), they would each be approximately 0.10 inch high.

Referring now to FIG. 5, the light 30 incident upon the left side of the multi-prism bar illustrated in FIGS. 1 and 2 is reflected by the prism reflecting surfaces 18 so that the light travels through the bar toward the base of the bar. It is well known and understood that the critical angle of a multi-prism bar composed of LUCITE or PLEXIGLAS is approximately 42° and that light incident upon the side of the multi-prism bar tends to be reflected from the surface of the bar as the angle of incidence of the light becomes increasingly greater than the critical angle. Incident light which is less than the critical angle enters and is transmitted to the prism reflecting surfaces 18. Since the prism reflecting surfaces are inclined at 45°, light incident on the side of the multi-prism bar with an angle of incidence of 0° has an angle of incidence of 45° with respect to the prism reflecting surfaces. Such light is deflected 90° and transmitted through the multi-prism bar toward its base. Light incident on the prism reflecting surfaces at angles greater than 45° is also reflected by the prism reflecting surfaces. However, unlike the light incident on the prism reflecting surfaces at 45° which is reflected substantially parallel to the longitudinal axis of the multi-prism bar, the light incident at angles on the prism reflecting surfaces greater than 45° is reflected toward the side walls of the prism bar at an angle to the longitudinal axis of the bar. Since the angle of incidence of this reflected light with the internal sides of the prism bar is greater than the critical angle, the light is internally reflected in the bar as the light proceeds towards the base of the bar. In this way, substantially all of the light incident on the prism reflecting surfaces is directed towards the base of the multi-prism bar where it is collected by appropriate means well known in the art such as a spherical lens formed at the base of the bar. The lens focuses the collected light onto appropriate light sensing means, also well known in the art.

Referring now to FIG. 6, there is illustrated an embodiment of the optical device of the present invention in which the height of each of the prisms in the multi-prism bar is uniform. This embodiment of the present invention could be utilized to collect and reflect light incident on the side of the bar which is uniform in intensity along the length of the bar. Similarly, the bar illustrated in FIG. 6 could be used to provide uniform illumination along a desired length from a light source positioned at its base.

Referring now to FIG. 7, utilization of one embodiment of the optical device of the present invention in an optical sensing apparatus is illustrated. As previously indicated, it is common in magnetic tape transport systems to provide a tape loop storage column 40 for purposes of isolating a portion of the tape 42 for rapid acceleration and deceleration by a capstan 44. It is important in such systems to continuously monitor the position of the tape loop 42 in the column 40 so that the position of the tape loop can be controlled by the reel 46. The reel 46 controls the length of the tape loop in the column by taking up or supplying a certain length of tape to the column. By this operation, the tape loop is prevented from exceeding its excursion limits at the top and bottom of the tape column.

In the loop sensing apparatus schematically illustrated in FIG. 7, a frosted light bar 48 is positioned along one boundary of the path of travel of the tape in the storage column. A multi-prism bar 50 (the same as the multi-prism bar 8 illustrated in FIG. 1 and described in detail above) is positined directly opposite the light bar 48 so as to form the other boundary of the path of travel of the tape.

Light sensing means 52 are positioned beneath the base of the multi-prism bar 50 and a light source 54 is positioned beneath the frosted light bar 48. When the tape is at the position marked X, the tape blocks off the light normally incident on all the prisms in the multi-prism bar above the dashed line mark X. Since the prisms in the bar beneath the line marked X continue to receive light from the unblocked portion of the light bar, the light reflected onto the photosensor 52 is directly proportional to the position of the tape loop in the storage column. The signal generated by the light sensing means 52 is transmitted to reel control means which direct the reel motor to either lengthen or shorten the tape loop in the storage column.

It will be obvious to those skilled in the art that various other configurations of the optical devices described herein can be substituted for the configuration illustrated in FIG. 7. For example, the frosted light bar 48 could be utilized to provide the light for a second tape storage column for the tape loop (not shown) on the other side of the capstan 44. Also, another light source could be placed at the top portion of the frosted light bar so that two light sources would be utilized. Also, the multi-prism bar 50 could be replaced by two multi-prism bars with the apex of each of the bars being contiguous and with light sensing means at the base portions of each of the bars. In this configuration, the upper prism reflecting surfaces would slant in a direction opposite to the direction of slant of the prism reflecting surfaces in bar 50. This configuration could be used in conjunction with the frosted light bar having a light source at both ends. In another configuration, the frosted light bar 48 could be replaced by a multi-prism bar in which the prisms slanted in a direction opposite to the direction of slant of the prism reflecting surfaces in bar 50. Also, due to the principle of reciprocity inherent in the operation of optical devices, the multi-prism bar 50 in the configuration of FIG. 7 might be replaced by a frosted light bar.

Referring now to FIG. 8, another embodiment of the present invention is illustrated in which two multi-prism bars 60 and 62 are shown in a configuration suitable for monitoring the position of an object along the length of the multi-prism bars. In this embodiment, as in the embodiment illustrated in FIG. 6, the height of each of the prisms of both bars is uniform.

From the foregoing description of the multi-prism bar and of the various optical sensing systems using the multi-prism bar, it should be appreciated that in addition to the variation and modification shown or suggested, other variations and configuraitons of the optical devices described will be apparent to those skilled in the art, and the scope of the invention is therefore not to be considered limited to the specific embodiments shown or suggested.

As indicated above with respect to FIG. 1, the prism legs 14 and 16 are equal in length. Also, the length of the prism legs 14 and 16 is the same for all the prisims in the multiprism bar. Thus, referring to FIGS. 2, 7 and 8, the vertical distance between the prism reflecting surfaces is equal. Since each of the prism reflecting surfaces is equally spaced from one another, and since the light intensity reflected from all of the prism reflecting surfaces onto the light sensing means is equal, the signal generated in the light sensing means is linear and directly proportional to the number of prism reflecting surfaces upon which light is incident. This, of course, corresponds to the linear position of the object being sensed. For example, referring to FIG. 7, if the light energy reflected from each prism is equal to 1 mullivolt, a signal of 4 millivolts would be generated in the photosensor 52 since this is the number of reflecting prisms upon which light is incident. The tape loop can be dessignated as being at position 4. If the tape loop rises so that it no longer blocks light from the fifth prism, a signal of 5 millivolts will be generated by the photosensor and the exact linear position of the tape loop will be known.

Another feature of this invention is that the area of the prism reflecting surfaces may increase from the leading edge to the trailing edge of the prism reflecting surface to compensate for the slight decrease in the intensity of the incident light as it traverses the width of the multiprism bar.

Instead of molding the multiprism bar of this invention, a series of grooves may be cut or molded in a bar having an essentially rectangular cross section. The grooves would be cut or molded at varying depths and the prism reflecting surfaces would be formed by polishing the lowermost portion of the grooves. The top view of a multiprism bar constructed in this fashion would appear the same as the top view of the multiprism bar illustrated in FIG. 2.

What is claimed is:

1. Optical device for transmitting and collecting light energy comprising a longitudinally extending bar composed of transparent material, said bar having a longitudinally extending bottom wall, first and second parallel side walls, said side walls extending perpendicularly from said bottom wall and a surface which is inclined with respect to said bottom wall, a plurality of totally reflecting prisms being formed on said inclined surface, said reflecting prisms each including a reflecting surface extending between said first and second side walls, said prisms being arranged in stepwise fashion along said surface such that the intersections between each said reflecting surface and said first side wall lie in the same plane as the intersections between each said succeeding reflecting surface and said second side wall, each of said prisms occupying a distinct space above said bar bottom wall, said prisms occupying the entire space between said bar bottom wall and top wall.

2. The optical device recited in claim 1 wherein each of said prisms has a reflecting surface and the area of said prism reflecting surfaces is uniform.

3. The optical device recited in claim 1 wherein each of said prisms has a reflecting surface and the areas of said prism reflecting surfaces differ.

4. The optical device recited in claim 3 wherein the area of each of said prism reflecting surfaces is proportional to the energy of the light incident on siad surfaces.

5. The optical device recited in claim 1 wherein each of said prisms has a reflecting surface, each of said prisms reflecting surfaces being positioned such that light incident on the side of said bar is internally reflected through said bar to the base of said bar by said prism reflecting surfaces and light incident on the base of said bar is transmitted through said bar and reflected out from the bar along its length by said prism reflecting surfaces.

6. Optical device comprising a longitudinally extending bar composed of transparent material, said bar having a longitudinally extending bottom wall and a surface which is inclined with respect to said bottom wall, first and second parallel side walls extending perpendicularly from said bottom wall, a plurality of totally reflecting prisms being formed on said inclined surface, the length of the legs of each of said prisms being equal, the distance between said first and second side walls being equal to the length of said prism legs, said prisms being arranged in stepwise fashion along said surface, each of said prisms occupying a distinct space above said bar bottom wall.

7. Optical device comprising a longitudinally extending bar composed of transparent material, said bar having a longitudinally extending bottom wall, first and second parallel side walls extending perpendicularly from said bottom wall, a plurality of totally reflecting prisms being formed in said bar, the length of the legs of each of said prisms being equal the distance between said first and second side walls being equal to the length of said prism legs, said prisms being arranged in steplike fashion within said bar, each of said prisms occupying a distinct space above said bar bottom wall.

8. Optical device for transmitting and collecting light energy comprising an elongated member composed of transparent material, said elongated member having first and second side walls, said side walls being parallel to one another, said elongated member having at least two reflecting surfaces, each of said two reflecting surfaces extending from said first side wall to said second side wall, said reflecting surfaces being parallel to one another, each of said two reflecting surfaces forming an angle of 45° with said first side wall, the intersection between said first side wall and the first of said two reflecting surfaces being defined as said first reflecting surface leading edge, the intersection between said first side wall and the second of said two reflecting surfaces being defined as said second reflecting surface leading edge, the distance between said first reflecting surface leading edge and said second reflecting surface leading edge being equal to the distance between said first and second side walls.

9. The optical device recited in claim 8, said first and second reflecting surfaces each having a top edge and a bottom edge, said first reflecting surface leading edge extending between said first reflecting surface top edge and bottom edge, said second reflecting surface leading edge extending between said second reflecting surface top edge and bottom edge, said first reflecting surface top edge lying in the same plane as said second reflecting surface bottom edge.

10. The optical device recited in claim 8, said first and second reflecting surfaces having equal surface areas.

11. The optical device recited in claim 8, said first reflecting surface having a greater surface area than said second reflecting surface.

12. The optical device recited in claim 11, the surface areas of said first and second reflecting surfaces being inversely proportional to the light energy incident on said first and second reflecting surfaces.

13. The optical device recited in claim 8, further comprising a plurality of additional reflecting surfaces, each of said additional reflecting surfaces extending from said first side wall to said second side wall, said additional reflecting surfaces each being parallel to said first reflecting surface, the intersections between said first side wall and each of said additional reflecting surfaces being defined as said additional reflecting surface leading edges, the distance between each of said additional reflecting surface leading edges being equal to the distance between said first and second side walls.

14. The optical device recited in claim 13, said additional reflecting surfaces each having a top edge and a bottom edge, said additional reflecting surfaces each being positioned one above the other in a direction parallel to said additional reflecting surface leading edges, said top edge of each said additional relfecting surface lying in the same plane as said bottom edge of said nearest adjacent additional reflecting surface.

* * * * *